United States Patent [19]

Kawashima

[11] Patent Number: 4,678,616

[45] Date of Patent: Jul. 7, 1987

[54] METHOD OF PRODUCING PERMANENT MAGNET

[75] Inventor: Giichi Kawashima, Takatsuki, Japan

[73] Assignee: Sumitomo Bakelite Company Limited, Tokyo, Japan

[21] Appl. No.: 792,856

[22] Filed: Oct. 30, 1985

[30] Foreign Application Priority Data

Nov. 7, 1984 [JP] Japan ................................ 59-233303

[51] Int. Cl.[4] ................................................ B29C 35/08

[52] U.S. Cl. ...................................... 264/24; 264/108; 264/328.12; 264/328.18; 264/DIG. 58; 310/164; 310/171; 425/3; 425/174.8 R; 425/DIG. 33

[58] Field of Search .............. 264/22, 24, 108, 328.12, 264/328.18, DIG. 58; 425/174.8 R, 3, DIG. 33; 310/164, 171

[56] References Cited

U.S. PATENT DOCUMENTS

| | | | |
|---|---|---|---|
| 3,564,654 | 2/1971 | Steingroever | 264/24 |
| 3,840,624 | 10/1974 | Tombs | 264/22 |
| 3,842,148 | 10/1974 | Loubier | 264/24 |
| 3,849,213 | 11/1974 | Baermann | 264/24 |
| 4,009,406 | 2/1977 | Inariba | 310/164 |
| 4,327,346 | 4/1982 | Tada et al. | 264/328.1 |
| 4,441,875 | 4/1984 | Saito et al. | 425/3 |
| 4,488,076 | 12/1984 | MaCleod | 310/171 |
| 4,496,303 | 1/1985 | Loubier | 425/569 |

FOREIGN PATENT DOCUMENTS

| | | | |
|---|---|---|---|
| 55-98813 | 7/1980 | Japan | 264/24 |
| 57-130407 | 8/1982 | Japan | 264/22 |

*Primary Examiner*—Jeffery Thurlow
*Attorney, Agent, or Firm*—Browdy and Neimark

[57] ABSTRACT

A method of producing a permanent magnet in which a material containing ferromagnetic powder is molded into a columnar or cylindrical molded body through injection molding, compression molding, or the like, in a magnetic field capable of orienting and magnetizing the ferromagnetic powder. The method comprises the steps of applying a magnetic field to the molded body in the unidirection perpendicular to an axis of rotation of the molded body to orient and magnetize the molded body so as to have two magnetic poles of N and S; demagnetizing the magnetized molded body; and divisionally remagnetizing the demagnetized molded body on its outer or inner surface to form at least two stripes of N and S poles arranged alternately and extending parallel to the axis of rotation of the molded body.

2 Claims, 6 Drawing Figures

METHOD OF PRODUCING PERMANENT MAGNET

BACKGROUND OF THE INVENTION

1. Field of the Invention

The present invention relates to a method of producing a permanent magnet, and more particularly to a method of producing a plastic magnet by molding a plastic material containing ferromagnetic powder through injection molding, compression molding, or the like, in an orientating magnetic field.

2. Description of the Prior Art

Conventionally, isotropic permanent magnets produced through sinter-molding have been used as rotors of miniature electric motors. Such permanent magnets produced through sinter-molding, however, have disadvantages that the moment of inertia is large due to the heavy weight thereof, that faulty products may occur due to cracking and/or chipping caused in the magnets during transportation, in the step of assembling a motor, in the step of press-inserting a rotary shaft into a rotor, etc., and that foreign matter due to chipping caused by the magnets causes motor faults. In order to eliminate the foregoing disadvantages, to rationalize the production steps by reducing the number of parts, and to reduce the cost of production, there have been brought to market plastic magnets which are permanent magnets obtained in such a manner that a material consisting of plastic matrix and ferromagnetic powder is molded through injection molding, compression molding, or the like, in an orientating magnetic field to thereby produce an orientated and magnetized molded body of a permanent magnet.

In a stepping motor which is typical of miniature motors, the rotor is multi-polarized in the direction parallel to the rotary shaft thereof to form about twenty four magnetic poles on the outer circumference thereof. The plastic magnets, on the other hand, have surface magnetic flux density such that they can not reach that of isotropic sintered magnets, and therefore, they are used only in extremely limited range of applications, or otherwise, they are subject to polar anisotropic orientation molding to elevate the surface magnetic flux density.

In performing polar anisotropic orientation molding, in orientation magnetic field equipment, there are such disadvantages that the metal mold is complicated in structure and it is impossible to manufacture a number of products at the same time, resulting in extremely low productivity. Further, it is necessary to maintain the temperature of the metal mold above 60° C. during molding, so that the life of an electromagnetic coil used for generating a magnetic field is not stable.

In the case of radial orientation, on the other hand, there is such a disadvantage that when the molded body has such a large ratio of length of molded body (axial direction) to diameter as exceeding 1, the degree of orientation is extremely reduced, and, even if the orientation degree can be kept high, the magnetic flux density is not uniform in the axial direction so that it is impossible to obtain uniform property of magnetic force.

SUMMARY OF THE INVENTION

The present inventors have conducted extensive research in order to obtain plastic permanent magnets having a large magnetic force which could not be obtained in the conventional similar plastic permanent magnets produced in such a manner that a columnar or cylindrical body molded with a material consisting of plastic matrix and ferromagnetic powder is multi-polarized on outer or inner surface of the body to form a plurality of stripes of N and S poles arranged alternately and extending parallel to the axis of rotation. As a result, it has been found that if the molded body is once oriented by applying lines of magnetic force only in one direction perpendicular to the axis of rotation of the molded body, the molded body can be polarized and magnetized on its outer or inner surface to form a plurality of stripes of N and S poles arranged alternately and extending parallel to the axis of rotation of the molded body, regardless of its length-to-diameter ratio, and that the thus magnetized molded body has a higher matrix flux density than that of isotropic sintered magnets. Based on this finding, the present invention has been completed.

It is an object, therefore, to eliminate the disadvantages in the prior art.

To attain the above object, according to an aspect of the present invention, there is provided a method of producing a permanent magnet in which a material containing ferromagnetic powder is molded into a columnar or cylindrical molded by means of injection molding, compression molding, or the like, in a magnetic field capable of orienting and magnetizing the ferromagnetic powder, which method comprises the steps of applying a magnetic field to the molded body in the unidirection perpendicular to an axis of rotation of the molded body to orient and magnetize the molded body so as to have two magnetic poles of N and S, demagnetizing the magnetized molded body, and divisionally remagnetizing the demagnetized molded body on its outer or inner surface so as to form at least two stripes of N and S poles arranged alternately and extending parallel to the axis of rotation of the molded body.

Preferably, the raw material is a plastic compound consisting of ferromagnetic powder of at least 70% by weight and a plastic matrix.

Any plastic material, either thermosetting one or thermoplastic one, may be used in the method according to the present invention.

There is no restriction in kind of the ferromagnetic powder so far as it is ferrite of strontium, barium, or the like, a rare earth element, or the like, which can be used to form a permanent magnet.

BRIEF DESCRIPTION OF THE DRAWINGS

FIG. 6 are diagrams shows various states of orientation in a molded body, in which (a) shows isotropic orientation, (b) radial anisotropic orientation, (c) 4-polar anisotropic orientation, and (d) unidirectional anisotropic orientation according to the present invention.

DESCRIPTION OF PREFERRED EMBODIMENTS

Figure 1:
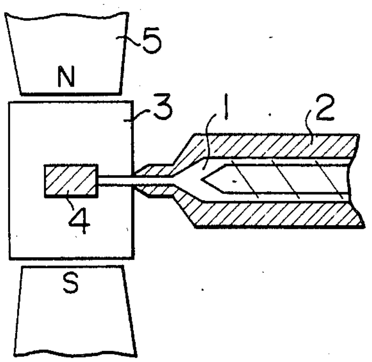
FIG. 1 is a schematic diagram showing an injection molding apparatus.

Referring to the drawings, preferred embodiments of the present invention will be described in detail hereunder.

In FIG. 1, a raw material 1 for a plastic magnet, containing plastic substances as a matrix is injected into a desired shape cavity 4 of a metal mold 3 by a cylinder 2 of an injection molding machine. The metal mold 3 is vertically sandwiched by a yoke 5 wound with an electromagnetic coil (not shown) for generating a necessary magnetic field. During the injection of the raw material 1, that is from the start of raw material charging to the completion thereof, lines of magnetic force are unidirectionally generated by the yoke 5 so as to magnetize and unidirectionally orient a ferromagnetic substance in the raw material 1.

Figure 2A:
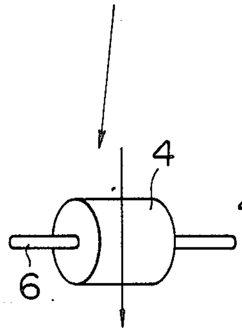
FIG. 2 is a schematic diagram showing the external shape of a molded body and the state of orientation of the same.
Figure 2B:
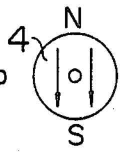
Figure 3:
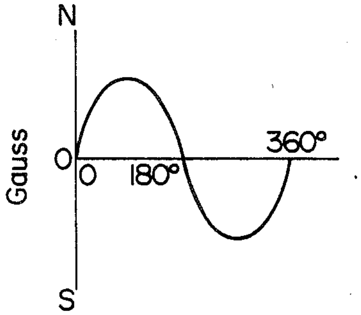
FIG. 3 is a graph showing the result of measurement of surface magnetic flux density in the outer periphery of the molded body of FIG. 2.
Figure 4A:
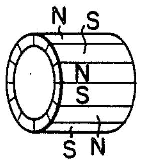
FIG. 4(*a*) is a schematic perspective view of a molded body after remagnetization, and FIG. 4(*b*) is a diagram showing a molded body and a yoke for magnetizing the outer surface of the molded body.
Figure 4B:
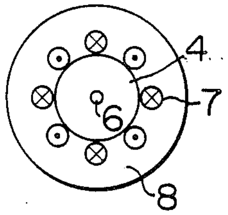
Figure 5:
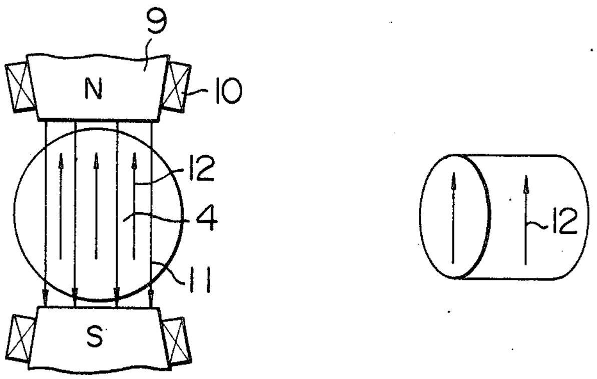
FIG. 5 is a schematic diagram showing a perpendicular magnetic field orientation used in the present invention.
Figure 5:
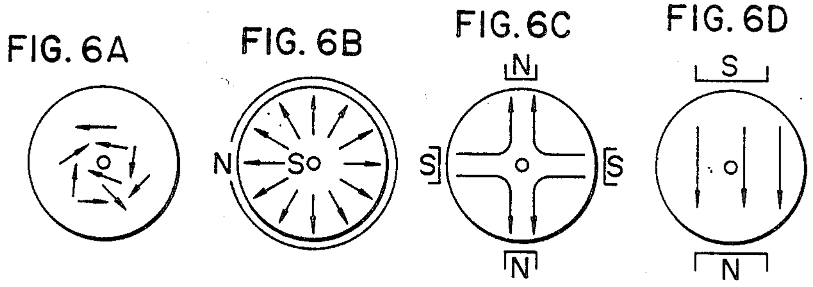

The resultant molded body is cooled and then taken out of the cavity 4. In this stage, the molded body provided with a rotary shaft 6 made of SUS is orientation-magnetized so as to have two poles as shown in FIG. 2, and the magnetic flux density at the outer periphery of the molded body has a distribution along a sine curve as shown in FIG. 3. Then, the molded body is demagnetized and placed in an iron yoke 8 having magnetizing conductors 7 as shown in FIG. 4(*b*), where the molded body 4 is divisionally remagnetized in such a manner that a plurality of stripes of N and S magnetic poles arranged alternately and extending parallel to the axis of rotation of the molded body are formed in the outer periphery of the molded body 4 as shown in FIG. 4(*a*).

The permanent magnet obtained by the method as described above is very excellent because it is superior in its property of magnetic force and free from longitudinal deviation in magnetic characteristics, as compared with those obtained in accordance with the orientation techniques such as radial anisotropic orientation, polar anisotropic orientation, etc.

Here, the orientation performed through the orienting method according to the present invention may be referred to as "perpendicular magnetic field orientation" because a magnetic field is applied to a molded body in the direction perpendicular to the axis of rotation of the molded body.

As described above, according to the orienting method according to the present invention, a magnetic field is applied to a columnar or cylindrical molded body in the unidirection perpendicular to the axis of rotation of the molded body, so that the ferromagnetic substance contained in the molded body can be easily oriented and the inner or outer surface of the molded body can be magnetized to form multi-poles, and that the resultant molded body is improved in frequency characteristics because of its higher property of magnetic force than those of isotropic sintered magnets as well as because of its light weight. Further, in the orienting method according to the present invention, it is possible to obtain a property of magnetic force which is uniform in the direction of the axis of rotation of the molded body. Unlike the case of radial orientation, there is no restriction for the structure of the metal mold; unlike the case of polar orientation, it is possible to produce numbers of molded bodies at the same time, and it is possible to obtain very high productivity.

Examples will be described hereunder as to varieties of thermoplastic magnets made of a raw material consisting of 12 weight % nylon and 88 weight % strontium ferrite.

Various molded bodies were obtained by generating magnetic fields of isotropy orientation, polar anistropy orientation, radial anisotropy orientation, and unidirectional anisotropy orientation, respectively, by using an injection molding machine having coils for generation of an orientation magnetic field. Each of these molded bodies was a column of 18 mm in diameter and 25 mm in length. The relationship between the direction of orientation the magnetic field, with respect to those molded bodies are shown in FIG. 6.

The molded articles were than demagnetized and subsequently divisionally magnetized in such a manner that 2 to 24 stripes of N and S poles arranged alternately and extending parallel to the axis of rotation of each molded body were formed in the outer circumference of each molded body. The resultant molded bodies were evaluated and the results of evaluation are shown in Table 1.

TABLE 1

Properties of Multi-polar Magnetized Molded Bodies

| | | | Plastic magnet | | | |
|---|---|---|---|---|---|---|
| | | Sintered Magnet Isotropy | Isotropy | Radial anisotropy | 4-polar anisotropy | Unidirection anisotropy (the invention) |
| Magnetic flux density at the outer surfaces of molded body (Gauss) | 2 poles | 1,000 | 800 | 850 | 1,000 | 1,400 |
| | 24 poles | 800 | 650 | 750 | 800 | 900 |
| Molding cost | | X | | | X | |
| Magnetic characteristics | | — | — | Non-uniform in longitudinal direction | — | — |
| Remarks | | After sintering, cutting, insertion, and molding are impossible. | — | Orientation is impossible when the ratio of length to diameter is not smaller | Production of molded bodies large in number is impossible | — |

TABLE 1-continued

| Properties of Multi-polar Magnetized Molded Bodies | | | | |
|---|---|---|---|---|
| | Plastic magnet | | | |
| Sintered Magnet Isotropy | Isotropy | Radial anisotropy | 4-polar anisotropy | Unidirection anisotropy (the invention) |
| | | than 1. | | |

Note:
Each molded body contains 90% weight of strontium ferrite.
Magnetization: 2,000 μF, 1,000 V It is found from Table 1 that the multi-polar permanent magnet obtained according to the present invention is superior to the isotropic sintered magnet, in the property of its magnetic force when compared with the sintered magnet, and further that the plastic magnet of unidirectional anisotropic orientation according to the present invention can provide a higher performance than other plastic magnets of radial anisotropy orientation and polar anisotropy orientation.

In general, plastic magnets are free from cracking, chipping, etc., light in weight, and very high in productivity. Therefore, the plastic magnets produced according to the multipolarization technique of the present invention can be effectively substituted for isotropic sintered magnets conventionally used in the field of small motors.

What is claimed is:

1. A method of producing a permanent magnet in which a material containing ferromagnetic powder is molded into a columnar or cylindrical molded body through injection molding, compression molding, or the like, in a magnetic field capable of orienting and magnetizing the ferromagnetic powder, said method comprising the steps of:

applying a magnetic field to the molded body in the unidirection perpendicular to an axis of rotation of the molded body to orient and magnetize the molded body so as to have two magnetic poles of N and S;

demagnetizing the magnetized molded body so as to permit divisional remagnetizing of the molded body; and then divisionally remagnetizing the demagnetized molded body on its outer or inner surface to form at least two strips of N and S poles arranged alternately and extending parallel to the axis of rotation of the molded body.

2. A method of producing a permanent magnet according to claim 1, in which said raw material is a plastic compound consisting of ferromagnetic powder of at least 70% by weight and a plastic matrix.

* * * * *